United States Patent
Snyder

(10) Patent No.: US 7,841,613 B1
(45) Date of Patent: Nov. 30, 2010

(54) PEDALS FORWARD SEAT POST

(76) Inventor: Duane P. Snyder, P.O. Box 358, Bloomingdale, MI (US) 49026

( * ) Notice: Subject to any disclaimer, the term of this patent is extended or adjusted under 35 U.S.C. 154(b) by 229 days.

(21) Appl. No.: 12/079,503

(22) Filed: Mar. 28, 2008

(51) Int. Cl.
*B62J 1/08* (2006.01)
(52) U.S. Cl. .................................................. 280/281.1
(58) Field of Classification Search ............... 280/281.1
See application file for complete search history.

(56) References Cited

U.S. PATENT DOCUMENTS

| | | | | |
|---|---|---|---|---|
| 5,261,686 A | * | 11/1993 | Buckler | 280/274 |
| 5,308,030 A | * | 5/1994 | Bales | 248/214 |
| 5,709,430 A | * | 1/1998 | Peters | 297/201 |
| 5,911,429 A | * | 6/1999 | Shiau | 280/281.1 |
| 6,631,948 B1 | * | 10/2003 | Tsuge | 297/195.12 |
| 7,226,065 B2 | * | 6/2007 | Hutson | 280/226.1 |
| 7,455,356 B2 | * | 11/2008 | Park | 297/215.14 |
| 2003/0184135 A1 | * | 10/2003 | Bugle et al. | 297/195.1 |
| 2008/0296864 A1 | * | 12/2008 | Hutson | 280/288.1 |

* cited by examiner

*Primary Examiner*—Kevin Hurley
(74) *Attorney, Agent, or Firm*—James Creighton Wray

(57) ABSTRACT

A pedals forward seat post having serrated circular ends and a mid-section offsetting the ends allowing for a bicycle seat to be placed lower or closer to the ground so that the bicyclist may place both feet simultaneously on the ground while seated and at the same time maintaining the best seated bicycling leg distance between the seat and the pedals for seated bicycling.

8 Claims, 1 Drawing Sheet

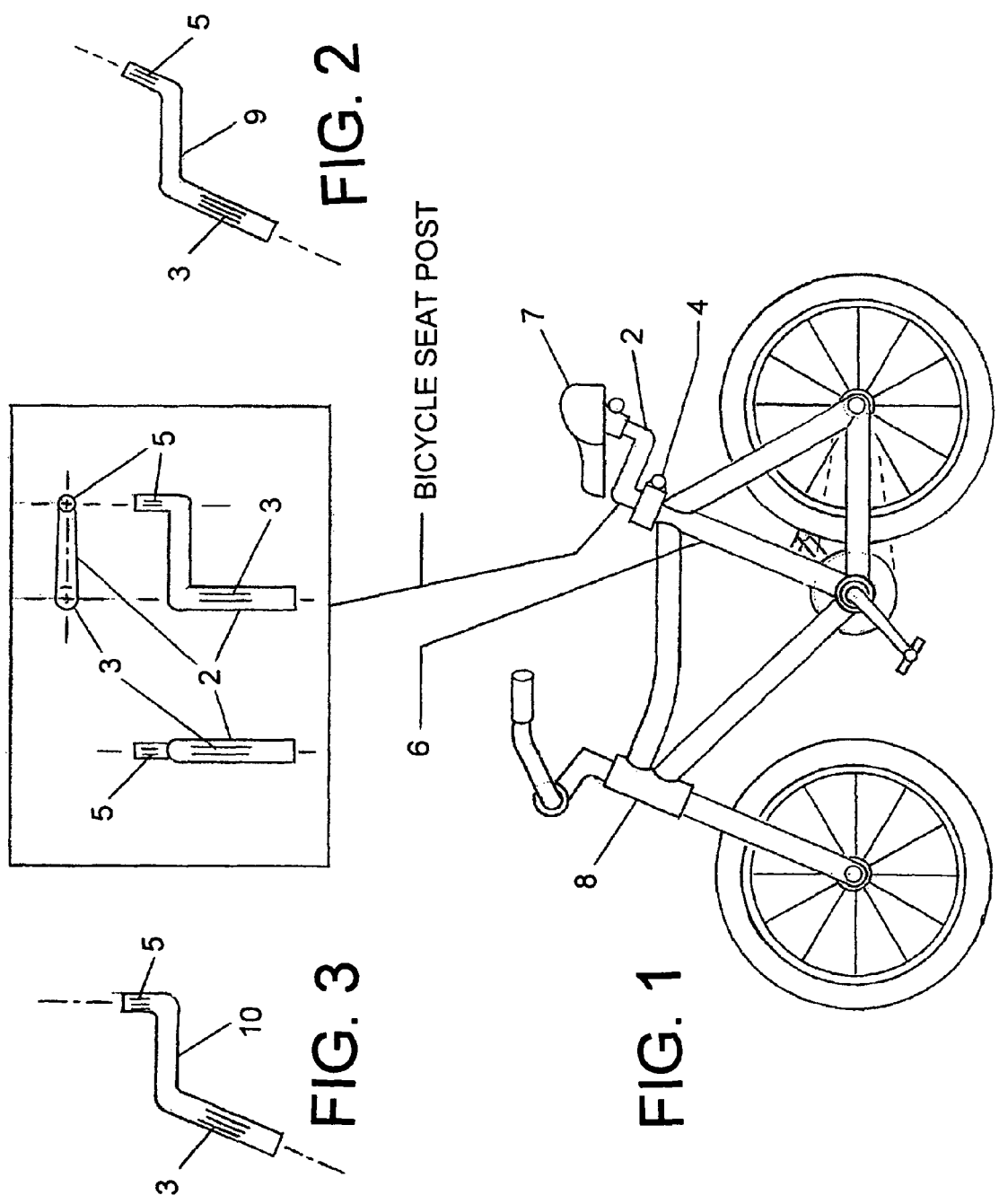

PEDALS FORWARD SEAT POST

TECHNICAL FIELD OF THE INVENTION

The present invention relates to the field of bicycles and bicycle parts.

BACKGROUND OF THE INVENTION

Prior art bicycles that allow the pedals to be more forward of the seat than most conventional bicycles require that the entire frame be designed and built differently than conventional bicycles.

Needs exist for improved devices for forward placement of bicycle pedals.

SUMMARY OF THE INVENTION

A pedals forward seat post having serrated circular ends and a mid-section offsetting the ends allowing for a bicycle seat to be placed lower or closer to the ground so that the bicyclist may place both feet simultaneously on the ground while seated and at the same time maintaining the best seated bicycling leg distance between the seat and the pedals for seated bicycling.

The pedals forward seat post of this invention includes two serrated circular ends and a mid-section offsetting the two ends allowing the bicycle seat to be placed more towards the rear of the bicycle. This allows for the seat to be lowered to maintain the best seated bicycling leg distance between the seat and pedals while also allowing the distance between the seat and the ground to be shortened so that the rider may place both his or her feet simultaneously on the ground. This also allows for the center of gravity of the rider and bicycle to be lower for better control and safer riding.

Accordingly it is an object of this invention to provide a pedals forward seat post having a novel and unique shape.

Another object of this invention is to provide a pedals forward seat post having a novel and unique method of lowering the center of gravity of a rider and bicycle while at the same time maintaining the best seated bicycling leg distance between the seat and pedals. The best seated bicycling leg distance is the distance between seat and pedals that is most comfortable and most efficient for a rider. It allows for the full extension of the rider's legs to the pedals during seated pedaling of the bike. The distance varies according to the height of the person or the length of their legs.

A new pedals forward seat post has a single offset seat post has two serrated circular end posts. The offset seat post can be mounted into a bicycle seat mast and provides a method of placing a bicycle seat lower and to the rear of a bicycle, thus maintaining the best seated bicycling leg distance between the bicycle seat and pedals while at the same time lowering a seated rider so that the rider's feet can reach the ground simultaneously. The offset seat post allows for the lowering of a rider and bicycle's centers of gravity while at the same time maintaining the best seated bicycling leg distance.

In a new method of lowering the height of a bicycle seat while maintaining the best seated bicycling leg distance between the bicycle seat and pedals, the pedals forward seat post is placed into a bicycle seat mast, the pedals forward seat post is secured to the bicycle seat mast with a seat post clamp, and a bicycle seat is secured to one of the serrated circular end posts.

A new bicycle with a bicycle seat of lower than normal height, but allowing for the best seated bicycling leg distance between the bicycle seat and pedals, includes the pedals forward seat post.

These and further and other objects and features of the invention are apparent in the disclosure, which includes the above and ongoing written specification.

BRIEF DESCRIPTION OF THE DRAWINGS

A preferred embodiment of this invention has been chosen for the purposes of illustration and description wherein:

FIG. 1 is a side elevation view of a bicycle having the pedals forward seat post in place with a breakout view of the pedals forward seat post from the side, front, and top.

FIG. 2 is a side elevation view of a second possible embodiment of this invention.

FIG. 3 is a side elevation view of a third possible embodiment of this invention.

DETAILED DESCRIPTION OF THE INVENTION

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The pedals forward seat post depicted in FIG. 1 consists of a single offset seat post 2 having two serrated circular ends 3 and 5. The pedals forward seat post 2 is placed into the bicycle seat mast 6 of the bicycle 8 and secured tightly by the seat post clamp 4. Bicycle seat 7 is mounted securely to the serrated circular end post 5. The pedals forward seat post can thus be used to modify an existing normal bicycle without any alteration of the frame. The pedals forward seat post embodiments 9, 10 depicted in FIGS. 2 and 3 are similar to that of FIG. 1 except that one or more of the ends 3, 5 are sloped. In FIG. 3 end 3 is sloped and end 5 is straight. In FIG. 2, both ends 3, 5 are sloped.

Operation

The pedals forward seat post provides a lower seat position while maintaining the best seated bicycling leg distance for bicycling. The best seated bicycling leg distance is the distance between seat and pedals that is most comfortable and most efficient for a rider. It allows for the full extension of the rider's legs to the pedals during seated pedaling of the bike. The distance varies according to the height of the person or the length of their legs.

While the invention has been described with reference to specific embodiments, modifications and variations of the invention may be constructed without departing from the scope of the invention. It is to be understood that the invention is not to be limited to the details above given but may be modified within the scope of the following appended claims.

I claim:

1. A pedals forward seat post apparatus comprising a single offset seat post having parallel first and second offset serrated cylindrical end post sections and a mid-section offsetting the post sections.

2. The pedals forward seat post apparatus of claim 1, wherein the first cylindrical seat post section of the offset seat post is arranged to be mounted into a bicycle seat mast tube of a bicycle frame and wherein the second cylindrical seat post section is arranged for placing a bicycle seat lower and to the rear of a bicycle.

3. The pedals forward seat post apparatus of claim 2, further comprising a bicycle having a frame with a seal mast tube wherein when the offset seat post is mounted into the bicycle frame seat mast tube, and wherein a resulting placement of a bicycle seat maintains a best seated bicycling leg distance between the bicycle seat and pedals while at the same time lowering a seated rider so that the rider's feet can reach the ground simultaneously.

4. The pedals forward seat post apparatus of claim 1, further comprising a bicycle and a rider, and wherein the offset seat post is arranged for lowering of the rider and the bicycle's centers of gravity, while at the same time maintaining a best seated bicycling leg distance.

5. The pedals forward seat post apparatus of claim 1, wherein the mid-section is straight and at least one of the serrated end post sections is not perpendicular to the mid-section.

6. A method comprising lowering a height of a bicycle seat while maintaining a best seated bicycling leg distance between the bicycle seat and pedals, placing a first long end post section of a pedals forward seat post into a bicycle frame seat mast tube, securing the first long end post section of the pedals forward seat post to the bicycle frame seat mast tube with a seat post clamp, and securing a bicycle seat to a second short serrated circular end post.

7. The pedals forward seat post apparatus of claim 1, further comprising a bicycle with a bicycle seat of lower than normal height, but allowing the best seated bicycling leg distance between the bicycle seat and pedals.

8. A bicycle seat post having a serrated long cylindrical end section arranged for inserting in a seat post mast tube of a bicycle frame, having a mid-portion arranged for mounting parallel with a bicycle frame, and having a short cylindrical serrated end section arranged in a plane with the long section and the mid-section.

\* \* \* \* \*